(12) United States Patent
Shao et al.

(10) Patent No.: US 8,605,797 B2
(45) Date of Patent: Dec. 10, 2013

(54) METHOD AND SYSTEM FOR PARTITIONING AND ENCODING OF UNCOMPRESSED VIDEO FOR TRANSMISSION OVER WIRELESS MEDIUM

(75) Inventors: Huai-Rong Shao, San Jose, CA (US); Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1505 days.

(21) Appl. No.: 11/598,920

(22) Filed: Nov. 13, 2006

(65) Prior Publication Data

US 2007/0202842 A1   Aug. 30, 2007

Related U.S. Application Data

(60) Provisional application No. 60/773,826, filed on Feb. 15, 2006.

(51) Int. Cl.
*H04N 11/04*   (2006.01)
*G06K 9/46*    (2006.01)

(52) U.S. Cl.
USPC ............ 375/240.27; 375/240.24; 375/240.26; 382/236; 382/238

(58) Field of Classification Search
None
See application file for complete search history.

(56) References Cited

U.S. PATENT DOCUMENTS

| | | | |
|---|---|---|---|
| 4,661,862 A | 4/1987 | Thompson | |
| 5,189,510 A | 2/1993 | Henaff et al. | |
| 5,289,190 A * | 2/1994 | Shimoda et al. | 341/50 |
| 5,453,840 A | 9/1995 | Parker et al. | |
| 5,936,669 A * | 8/1999 | Niesen | 375/240.12 |
| 5,969,764 A * | 10/1999 | Sun et al. | 375/240.06 |
| 6,052,159 A * | 4/2000 | Ishii et al. | 375/240.27 |
| 6,088,045 A | 7/2000 | Lumelsky et al. | |
| 6,094,453 A * | 7/2000 | Gosselin et al. | 375/240.24 |
| 6,115,420 A * | 9/2000 | Wang | 375/240.03 |

(Continued)

FOREIGN PATENT DOCUMENTS

| | | |
|---|---|---|
| KR | 10-2009-0100219 A | 9/2009 |
| WO | 2004073201 A1 | 8/2004 |
| WO | WO 2004/073201 A1 | 8/2004 |
| WO | 2008060025 A1 | 5/2008 |

OTHER PUBLICATIONS

International Search Report and Written Opinion mailed Dec. 6, 2010 in PCT/KR2010/002192, 6 pp., Korean Intellectual Property Office, Republic of Korea.

(Continued)

*Primary Examiner* — Joseph Ustaris
*Assistant Examiner* — Frederick Bailey
(74) *Attorney, Agent, or Firm* — Kenneth L. Sherman, Esq.; Michael Zarrabian, Esq.; Sherman & Zarrabian LLP (57) ABSTRACT

A method and system for transmitting uncompressed video over a wireless channel by inputting a frame of pixel information, partitioning spatially correlated pixels into different packets, and transmitting the packets separately over a wireless channel. For robust transmission, error detection data can be generated for each packet and appended to each packet before transmission. A receiver receives the transmitted packets and checks if a received packet is corrupt based on the appended error detection data. For a corrupt packet, the receiver corrects the corrupt pixels using pixel information in other received packets containing neighboring pixels to recover each corrupt pixel in the corrupt packet.

60 Claims, 8 Drawing Sheets

(56) References Cited

U.S. PATENT DOCUMENTS

| | | | |
|---|---|---|---|
| 6,201,834 | B1 | 3/2001 | Zhu |
| 6,239,886 | B1 | 5/2001 | Klassen et al. |
| 6,298,085 | B1 * | 10/2001 | Kondo et al. ............... 375/240 |
| 6,418,240 | B1 | 7/2002 | Yu |
| 6,512,218 | B1 | 1/2003 | Canini et al. |
| 6,571,016 | B1 | 5/2003 | Mehrotra et al. |
| 6,757,435 | B2 | 6/2004 | Kondo |
| 6,868,186 | B1 | 3/2005 | Sadeh |
| 6,973,221 | B1 * | 12/2005 | Xue .............................. 382/268 |
| 7,027,515 | B2 * | 4/2006 | Lin ......................... 375/240.25 |
| 7,075,993 | B2 | 7/2006 | O'Brien, Jr. |
| 7,099,678 | B2 | 8/2006 | Vaidyanathan |
| 7,113,556 | B1 * | 9/2006 | Heegard et al. ................ 375/346 |
| 7,227,900 | B2 * | 6/2007 | Porter et al. ............. 375/240.27 |
| 7,283,165 | B2 | 10/2007 | Alderson et al. |
| 7,339,993 | B1 | 3/2008 | Brooks et al. |
| 7,627,348 | B2 | 12/2009 | Lysejko et al. |
| 7,643,558 | B2 | 1/2010 | Garudadri et al. |
| 7,734,106 | B1 * | 6/2010 | Zhang et al. .................. 382/239 |
| 7,991,055 | B2 | 8/2011 | Cancemi et al. |
| 8,098,741 | B2 | 1/2012 | Suh et al. |
| 2002/0116715 | A1 * | 8/2002 | Apostolopoulos .............. 725/86 |
| 2003/0063676 | A1 * | 4/2003 | Prakash et al. ............ 375/240.27 |
| 2004/0032516 | A1 * | 2/2004 | Kakarala ....................... 348/246 |
| 2006/0013299 | A1 | 1/2006 | Sato et al. |
| 2006/0013320 | A1 | 1/2006 | Oguz et al. |
| 2006/0013321 | A1 * | 1/2006 | Sekiguchi et al. ........ 375/240.27 |
| 2006/0146940 | A1 | 7/2006 | Gomila et al. |
| 2006/0239360 | A1 * | 10/2006 | Kadono et al. ........... 375/240.27 |
| 2006/0268760 | A1 | 11/2006 | Fang et al. |
| 2007/0014360 | A1 * | 1/2007 | Botzko et al. ............. 375/240.16 |
| 2007/0091999 | A1 | 4/2007 | Nissan-Cohen et al. |
| 2007/0098063 | A1 | 5/2007 | Reznic et al. |
| 2007/0189383 | A1 | 8/2007 | Shao et al. |
| 2007/0296822 | A1 | 12/2007 | Lan et al. |
| 2008/0101467 | A1 | 5/2008 | MacMullan et al. |
| 2008/0107330 | A1 | 5/2008 | Cotman et al. |
| 2008/0144553 | A1 | 6/2008 | Shao et al. |
| 2008/0232478 | A1 | 9/2008 | Teng et al. |
| 2008/0267299 | A1 | 10/2008 | Hannuksela et al. |
| 2008/0285651 | A1 | 11/2008 | Au et al. |
| 2009/0021646 | A1 | 1/2009 | Shao et al. |
| 2009/0063935 | A1 | 3/2009 | Singh et al. |
| 2010/0014584 | A1 | 1/2010 | Feder et al. |
| 2010/0150463 | A1 | 6/2010 | Yeung et al. |
| 2010/0166057 | A1 | 7/2010 | Huchet et al. |
| 2010/0265392 | A1 | 10/2010 | Shao et al. |
| 2011/0109792 | A1 | 5/2011 | Montag |

OTHER PUBLICATIONS

Schwarz, H. et al., "Overview of the Scalable Video Coding Extension of the H.264/AVC Standard", IEEE Transactions on Circuits and Systems for Video Technology, vol. 17, No. 9, Sep. 2007, pp. 1-18, United States.

PCT International Search Report, International Application No. PCT/KR2007/003251, dated Oct. 12, 2007.

Hitachi Ltd. et al. High-Definition Multimedia Interface (HDMI) Specifications version 1.2, Aug. 22, 2005.

International Search Report and Written Opinion dated Oct. 12, 2007 for International Application No. PCT/KR2007/003251 from Korean International Property Office, filed Jul. 4, 2007, 10 pages, Seo-gu, Daejeon, Republic of Korea.

Korean Office Action dated Nov. 11, 2009 for Korean Patent Application No. 10-2008-7006604, pp. 1-3, Korean Intellectual Property Office, Seo-gu, Daejeon, Republic of Korea.

Korean Final Office Action dated Feb. 18, 2010 for Korean Patent Application No. 10-2008-7006604, pp. 1-2, Korean Intellectual Property Office, Seo-gu, Daejeon, Republic of Korea.

Korean Office Action dated Nov. 11, 2009 for Korean Patent Application No. 10-2008-7006604, pp. 1-3, Korean Intellectual Property Office, Seo-gu, Daejeon, Republic of Korea (Machine-generated English translation attached, pp. 1-2).

Korean Final Office Action dated Feb. 18, 2010 for Korean Patent Application No. 10-2008-7006604, pp. 1-2, Korean Intellectual Property Office, Seo-gu, Daejeon, Republic of Korea (Machine-generated English translation attached, p. 1).

U.S. Non-Final Office Action for U.S. Appl. No. 12/048,126 mailed Dec. 28, 2011.

U.S. Notice of Allowance for U.S. Appl. No. 11/897,087 mailed Apr. 25, 2012.

U.S. Non-Final Office Action for U.S. Appl. No. 12/048,126 mailed Oct. 22, 2012.

U.S. Notice of Allowance for U.S. Appl. No. 11/897,087 mailed Jan. 20, 2012.

U.S. Final Office Action for U.S. Appl. No. 12/048,126 mailed Mar. 20, 2013.

U.S. Non-Final Office Action for U.S. Appl. No. 12/754,522 mailed Jan. 18, 2013.

U.S. Final Office Action for U.S. Appl. No. 12/754,522 mailed May 16, 2013.

U.S. Non-Final Office Action for U.S. Appl. No. 12/048,126 mailed Aug. 21, 2013.

* cited by examiner

FIG. 7

METHOD AND SYSTEM FOR PARTITIONING AND ENCODING OF UNCOMPRESSED VIDEO FOR TRANSMISSION OVER WIRELESS MEDIUM

RELATED APPLICATION

This application claims priority from U.S. Provisional Patent Application Ser. No. 60/773,826, filed on Feb. 15, 2006, incorporated herein by reference.

FIELD OF THE INVENTION

The present invention relates to wireless communication and in particular to transmission of uncompressed video over wireless communication channels.

BACKGROUND OF THE INVENTION

With the proliferation of high quality video, an increasing number of electronic devices (e.g., consumer electronic devices) utilize high-definition (HD) video. Conventionally, most devices compress the HD video, which can be around 1 Gbps (giga bits per second) in bandwidth, to a fraction of its size to allow for transmission between devices. However, with each compression and subsequent decompression of the video, some video information can be lost and the picture quality is degraded.

The High-Definition Multimedia Interface (HDMI) specification defines an interface for uncompressed HD transmission between devices through HDMI cables (wired links). Three separate channels are used to transmit three component streams (R, G, B or Y, Cb, Cr). For each channel, pixels are transmitted in pixel-by-pixel order for each video line, and line-by-line for each video frame or field. The HDMI provides pixel-repetition functionality which repeats each pixel one or multiple times. The copies of each pixel directly follow the original pixel during the transmission at each component channel.

Existing Wireless Local Area Networks (WLANs) and similar technologies do not have the bandwidth needed to carry uncompressed HD video, such as providing an air interface to transmit uncompressed video over a 60 GHz bandwidth. Further, existing WLANs can suffer from interference issues when several devices are connected, leading to video signal degradation.

BRIEF SUMMARY OF THE INVENTION

The present invention provides a method and system for spatial video pixel partitioning and encoding for transmission of uncompressed video over wireless communication channels. In one implementation, this allows transmission of uncompressed HD video from a transmitter to a receiver over a wireless channel, and further allows error recovery at the receiver.

An example involves inputting a frame of pixel information, and partitioning spatially correlated pixels. Then, the partitioned pixels are placed into different packets and error detection information is generated for each packet and appended thereto. The packets are then transmitted by a transmitter to a receiver over a wireless channel. Based on the appended error detection data in each packet, the receiver determines if a received packet is corrupt. If a packet is corrupt, then the receiver recovers the corrupt pixels using pixel information in other received packets containing neighboring pixels. As a result, retransmission of corrupt pixels is not required. This improves transmission robustness and reduces channel bandwidth requirements.

Preferably, the partitioned pixels are placed into packets such that pixels with minimal spatial distance (i.e., neighboring pixels) are placed into different packets for transmission over the wireless channel. This can further include partitioning spatially correlated pixels into K different partitions, and selecting the value of the $n^{th}$ pixel at each K pixel block as base information. Then, the base information is placed in a packet as BASE pixels, and information of other pixels in the pixel block is encoded within the same block and placed in another packet as DIFF pixels.

In accordance with further features of a preferred embodiment of the present invention, recovering the corrupt pixels further includes determining a difference between each corrupt pixel in a corrupt packet with a corresponding pixel of an adjacent non-corrupt packet, and if the difference is greater than a threshold, then correcting each corrupt pixel using pixel information in that adjacent non-corrupt packet. Such correcting steps can be performed by replacing each corrupt pixel with a corresponding pixel in the adjacent non-corrupt packet, or by using an average of neighboring pixels of a corresponding pixel in the non-corrupt packet.

These and other features, aspects and advantages of the present invention will become understood with reference to the following description, appended claims and accompanying figures.

BRIEF DESCRIPTION OF THE DRAWINGS

In the drawings, like references refer to similar elements.

DETAILED DESCRIPTION OF THE INVENTION

The present invention provides a method and system for spatial video pixel partitioning and encoding for transmission of uncompressed video, such as over wireless communication channels. In one implementation, this allows transmission of uncompressed HD video from a transmitter to a receiver over a wireless channel.

There are two categories of HD video formats according to a display scan scheme: interlaced and progressive. In the progressive scheme the pixels are scanned line-by-line. However, in the interlaced scheme the pixels are scanned every other line and one video frame is divided into two sub-frames called odd line field and even line field. In each video frame, usually the neighboring pixels have very similar or even the same values. This type of spatial redundancy can be used in wireless transmission to improve video quality.

According to said embodiment of the present invention, neighboring pixels in a video frame are partitioned into different packets and transmitted separately over wireless channels from a transmitter to a receiver. If one packet is received corrupted (i.e., pixels lost or received with errors), then packets carrying the neighboring pixels are used to recover the pixels in the corrupt packet. As such, retransmission of lost information is not required, which saves transmission bandwidth.

Wireless transmission of uncompressed HD video (WiHD) requires higher Medium Access Control (MAC) packet transmission efficiency. Due to such high MAC efficiency requirements (and a relatively static channel), a WiHD packet can be very long (i.e., typically 300K-600K bits long). The present invention further provides the option of encoding pixels based on said spatial pixel partitioning method, which conserves transmission bandwidth.

Figure 1:
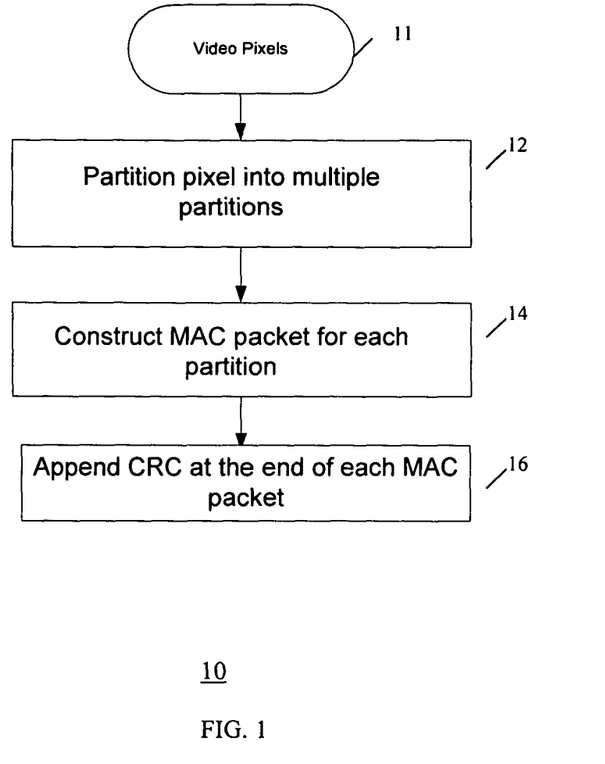
FIG. 1 shows a flowchart of an embodiment of a process for spatial partitioning of uncompressed video pixels for transmission over a wireless channel, according to an embodiment of the present invention.

FIG. 1 shows a flowchart 10 of an embodiment of a process for partitioning video pixels at a wireless transmitter, according to an embodiment of the present invention, including the steps of:

Step 11: Input video pixels.

Step 12: Determine a number of partitions K, and partition the pixels into K different partitions.

Step 14: Construct a MAC packet for each partition (i.e., packetizing), and place the corresponding partition pixels into the MAC packet.

Step 16: Determine error detection data (e.g., such as Cyclic Redundancy Code (CRC)) for each MAC packet, and append the error detection data to the MAC packet. Such a MAC packet is an example of a WiHD packet described above, for transmission from a transmitter to a receiver over wireless channels.

Figure 2:
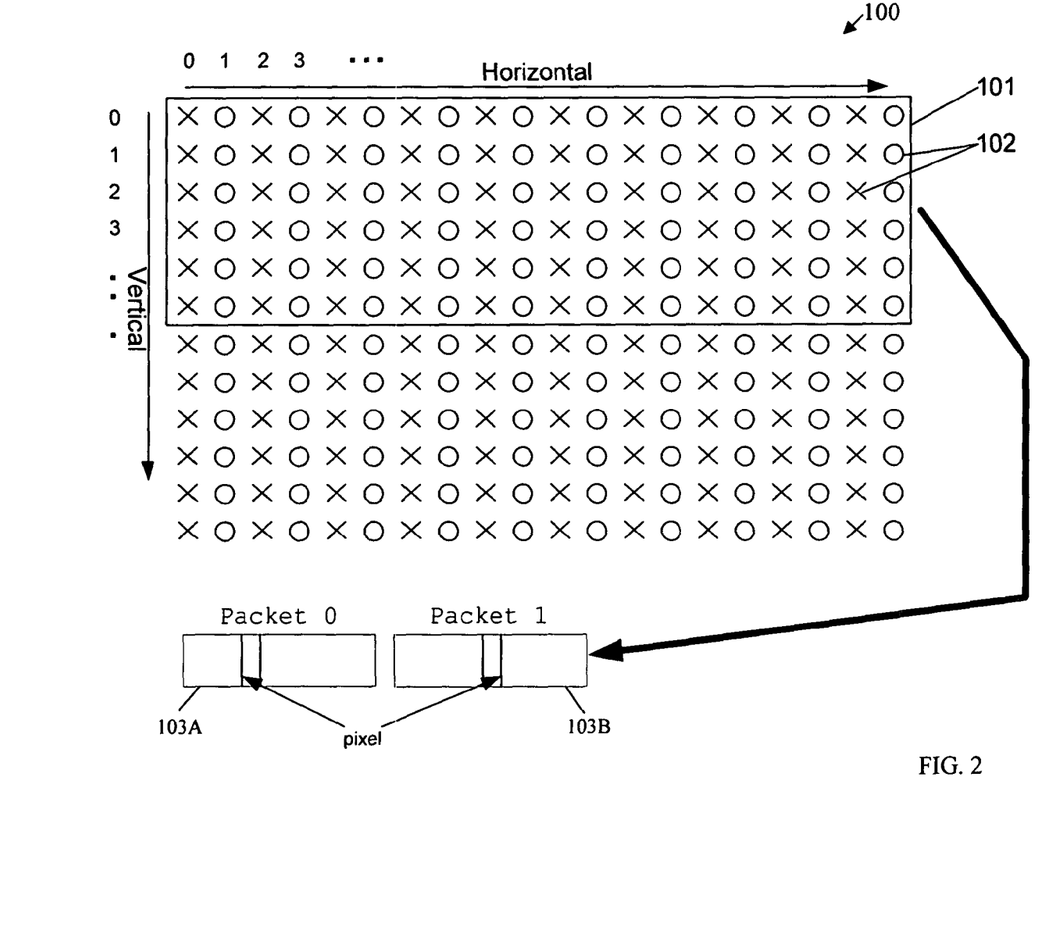
FIG. 2 shows an example of spatial partitioning of pixels into two partition packets, according to an embodiment of the present invention.

FIG. 2 shows a diagrammatical example application of the above partitioning and packetizing steps for K=2 partitions. An uncompressed video frame 100 includes a set 101 of pixels 102. The spatial location of each pixel 102 in the frame 100 can be identified by a column index i (horizontal), and a row index j (vertical). Each of the indices i and j can take on integer values 0, 1, 2, 3, 4, etc.

The pixels 102 are split horizontally into two groups: (1) the first group of pixels (marked as "X") have indices i=0, 2, 4, . . . , etc., per line and indices j=0, 1, 2, . . . , etc.; and (2) the second group of pixels (marked as "0") have indices i=1, 3, 5, . . . , etc., per line and indices j=0, 1, 2, . . . , etc. Then, as shown in FIG. 1, pixels from the first group are placed in a first packet 103A (i.e., Packet 0), and pixels from the second group are placed in a second packet 103B (i.e., Packet 1). Therefore, one or more pixels of first group are placed in the Packet 0, and one or more pixels of second group are placed in the Packet 1. As a result, spatially neighboring pixels are partitioned and placed into different packets.

Packet size is selected depending on transmitter and receiver buffer requirements. One or more lines worth of pixels can be placed in each packet. A CRC for each packet is computed and appended at the end of the packet before transmission to a receiver over a wireless channel.

In the uncompressed video frame 100, geographically neighboring (spatially correlated) pixels usually have very similar, or even the same values. Regardless of how pixel partitioning is performed, so long as spatially neighboring pixels are partitioned and placed into different packets for transmission, then if pixel information in a received packet is corrupted (i.e., lost or damaged), one or more other packets which contain pixels that are spatially related to the corrupt pixel(s) can be used to recover (compensate for) the corrupt pixel information.

There are many approaches for recovering a lost or erroneous pixel P. One approach involves simply copying a pixel Q from a neighboring packet, wherein preferably pixel Q is spatially correlated to pixel P. Another approach involves using a combination (e.g., the average value) of pixels R in neighboring packets, wherein preferably pixels R are spatially correlated to pixel P. Other approaches for recovering a lost or erroneous pixel based on the neighboring pixels can be utilized, as those skilled in the art will recognize.

Preferably, partitioning is performed such that pixels with minimal spatial distance are placed into different packets for transmission over a wireless channel. Further, partitioning can be performed by distributing y number of spatially correlated pixels into z number of different packets, wherein y≠z. In one example, y can be greater than z, whereby at least one of the packets includes two or more spatially correlated (neighboring) pixels from a partition. It is also possible to split pixels vertically. However, for interlaced format, since two neighboring lines are already split into two separate fields, it is preferable to partition horizontally for each field if only two partitions are required.

If more than two partitions are needed, then a combination of horizontal and vertical partitioning can be considered, as well as horizontal splitting or vertical splitting. Additional examples of partitioning according to the present invention wherein pixels are partitioned into more than two groups are provided below.

Figure 3A:
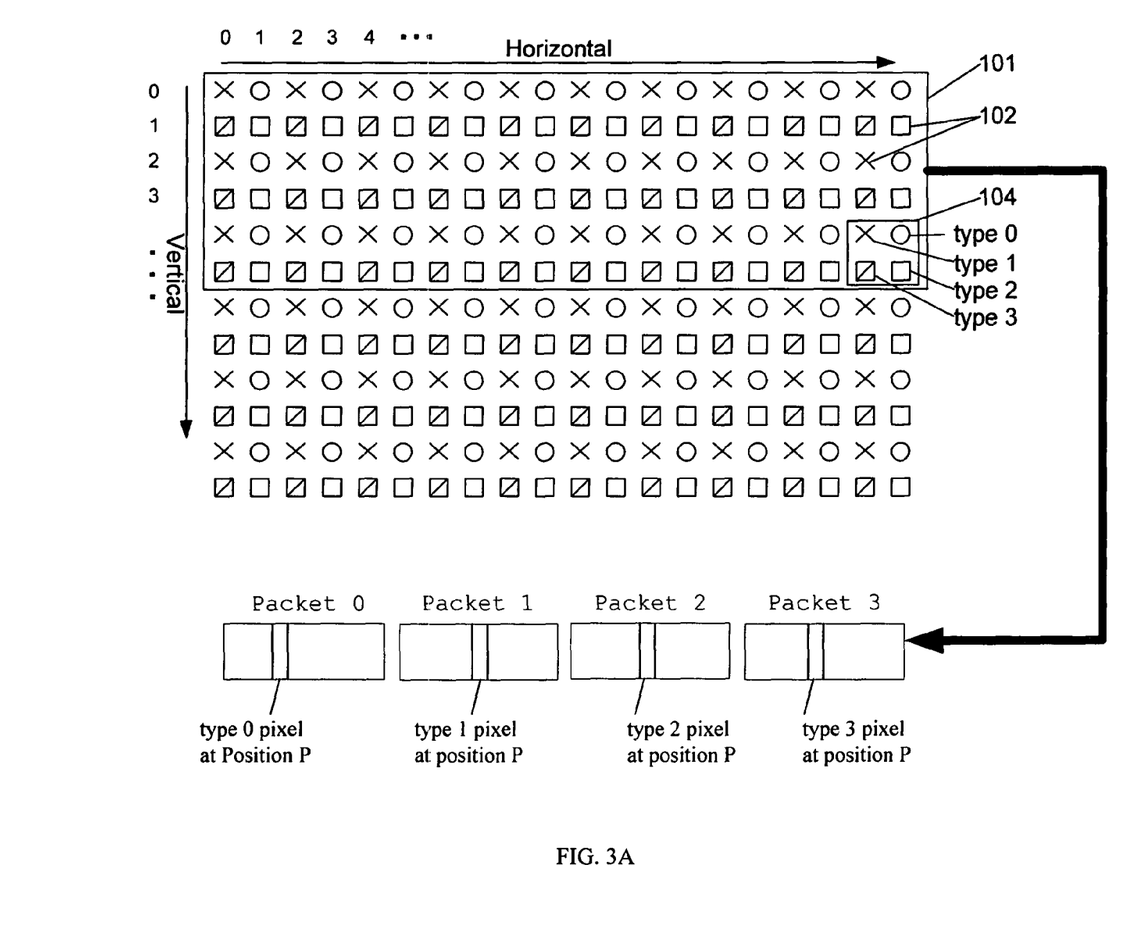
FIGS. 3A-B show further examples of spatial partitioning of pixels into four partition packets, according to embodiments of the present invention.

FIG. 3A shows an example application of the partitioning and packetizing steps for K=4 partitions. In this example, the pixels are split into, four types (i.e., types 0, 1, 2, 3) of 2×2 blocks 104, wherein K=4 pixels per block. The four pixels in each 2×2 block 104 are placed into 4 different packets (i.e., Packets 0, 1, 2, 3) as shown. Pixels with minimal spatial distance are placed into different packets for transmission.

Specifically, for the type 0 pixels, the indices i and j are even numbers (i.e., i=0, 2, 4, . . . , etc., and j=0, 2, 4, . . . , etc.), and the type 0 pixels are placed in the Packet 0. For the type 1 pixels, the index i is odd (i.e., i=1, 3, 5, . . . , etc.), the index j is even (i.e., j=0, 2, 4, . . . , etc.), and the type 1 pixels are placed in the Packet 1. For the type 2 pixels, the index i is even (i.e., i=0, 2, 4, . . . , etc.), the index j is odd (i.e., j=1, 3, 5, . . . , etc.), and the type 2 pixels are placed in the Packet 2. For the type 3 pixels, the indices i and j are odd numbers (i.e., i=1, 3, 5, . . . , etc., and j=1, 3, 5, . . . , etc.), and the type 3 pixels are placed in the Packet 3. A CRC for each packet is appended at the end of the packet before transmission to a receiver of a wireless channel.

If during transmission, a pixel in one packet (e.g., Packet 0) is corrupted, then spatially related pixels in the other three packets (e.g., Packets 1, 2, or 3) can be used at the receiver to compensate for the corrupted pixel. As such, if pixel information in position P in a packet (e.g., Packet 0 in FIG. 5) is corrupted, then the pixel information in position P in other spatially related packets (e.g., Packets 1, 2, or 3) can be used to compensate for the corrupted information.

Different packets can be transmitted at a single channel or at different channels/paths. In addition to robustness improvement, in the case when one channel/path cannot meet the bandwidth requirement for a HD stream, spatial pixel partitioning can take advantage of multi-channel/path to transmit all data of a HD video stream.

In general, square/rectangular blocks 104 (each block including multiple pixels therein), can be used for partitioning the multiple pixels in each block into corresponding multiple packets, wherein for each block, preferably each pixel in that block is placed in a different packet for transmission.

Figure 3B:
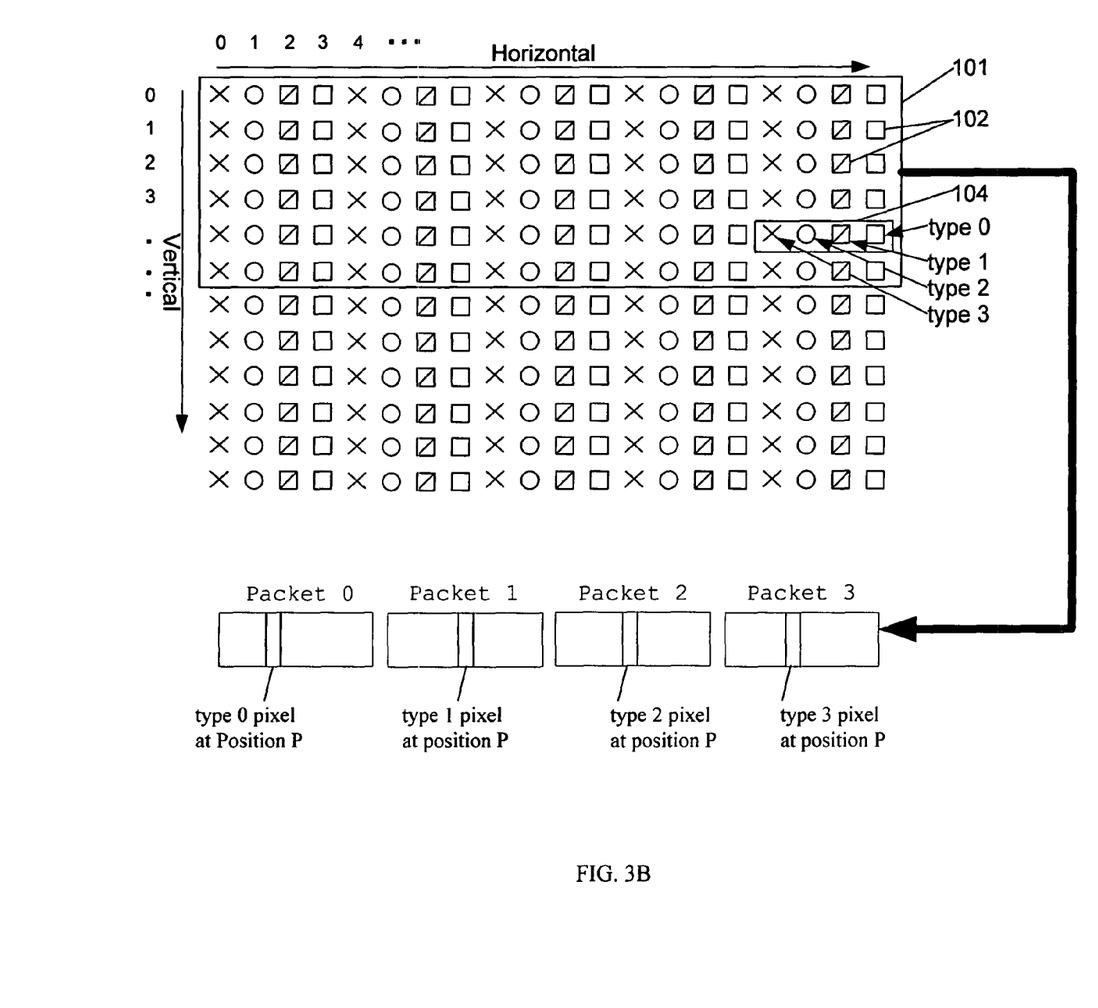

FIG. 3B shows an example application of the partitioning and packetizing steps for K=4 partitions. In this example, the pixels are again split into, four types (i.e., types 0, 1, 2, 3) of 1×4 blocks 104, wherein K=4 pixels per block. In this example, the blocks 104 are rectangular blocks compared to square blocks in the example shown in FIG. 3A.

In the example show in FIG. 3B, the four pixels in each 1×4 rectangular block 104 are placed into 4 different packets (i.e., Packets 0, 1, 2, 3) as shown. Specifically, for the type 0 pixels, the index i=3, 7, 11, . . . , etc., the index j=0, 1, 2, 3, . . . , etc., and the type 0 pixels are placed in the Packet 0. For the type 1 pixels, the index i 2, 6, 10, . . . , etc., the index j=0, 1, 2, 3, . . . , etc., and the type 1 pixels are placed in the Packet 1. For the type 2 pixels, the index i=1, 5, 9, . . . , etc., the index j=0, 1, 2, 3, . . . , etc., and the type 2 pixels are placed in the Packet 2. For the type 3 pixels, the index i=0, 4, 8, . . . , etc., the index j=0, 1, 2, 3, . . . , etc., and the type 3 pixels are placed in the Packet 3. In general, the index j=0, 1, 2, 3, 4, 5, . . . , etc., and the index i=(K-t) wherein t=1, 2, 3, . . . , K, and K=4 in this example.

At the receiver, the received packets are processed for errors. When based on a CRC check a packet is determined to be corrupt, in order to determine the corrupted pixels, all the pixels in the corrupt packet are compared with corresponding pixels in an adjacent non-corrupt packet, on a pixel-by-pixel basis. If there is a sharp change (i.e., greater than a pre-defined threshold) between two corresponding pixels which belong to different partitions/packets, then the pixel in the corrupt packet is likely wrong, and it is corrected based on adjacent packets (described below). Otherwise, the pixel is used as is.

Figure 4:
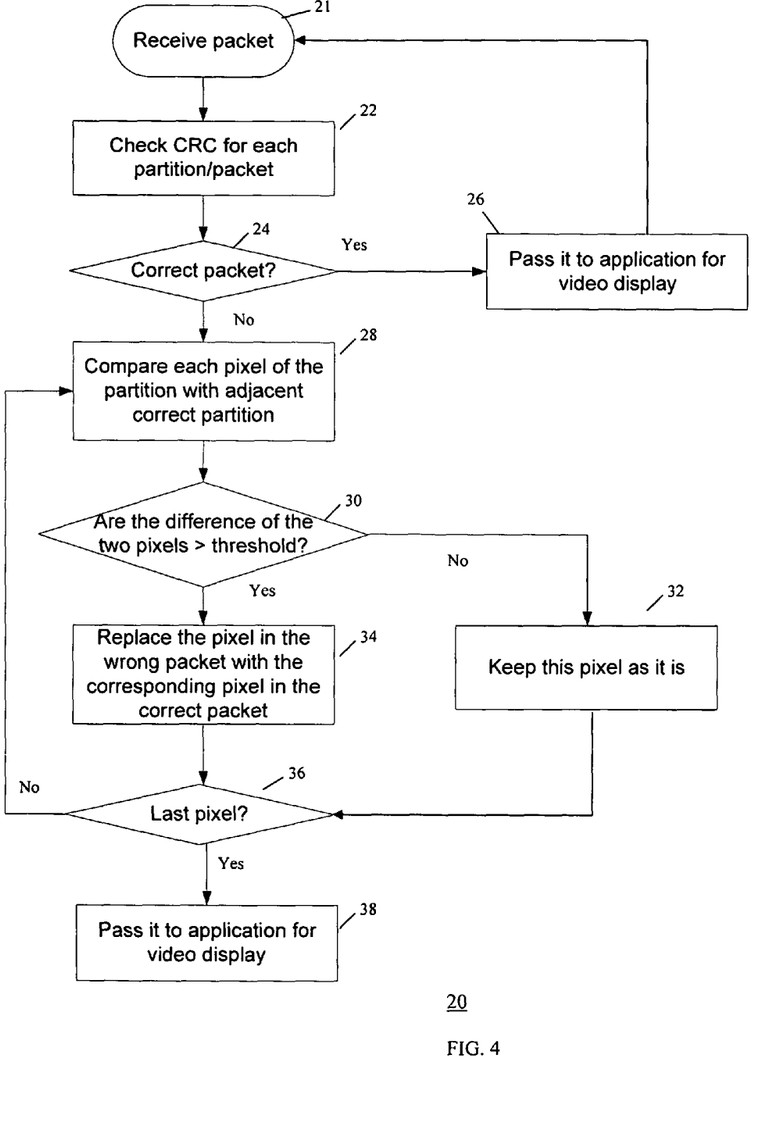
FIG. 4 shows a flowchart of an embodiment of a process for processing packets received at a receiver, according to an embodiment of the present invention

FIG. 4 shows a flowchart 20 of the steps for processing packets received at a receiver in an embodiment of the invention, including the steps of:

Step 21: Receive a packet.
Step 22: Check the CRC for a received packet.
Step 24: Based on the CRC, determine if the packet is corrupt (i.e., lost or erroneous pixel values). If not, go to step 26, otherwise go to step 28.
Step 26: Pass the received packet to higher layers for display. Go to step 21 to process the next packet.
Step 28: Determine a difference between each pixel in the corrupt packet with a corresponding pixel of an adjacent non-corrupt packet.
Step 30: Determine if the difference is greater than a threshold. If not, go to step 32, otherwise go to step 34.
Step 32: Retain the pixel. Go to step 36.
Step 34: Correct the pixel. In one example (e.g., K=2 partitions), correcting the pixel includes replacing the pixel in the corrupt packet with a corresponding pixel of the adjacent non-corrupt packet. In another example (K=4 partitions), correcting a corrupt pixel includes replacing the pixel in the corrupt packet with the average value of the neighboring pixels of an adjacent non-corrupted packet.
Step 36: Determine if any other pixels remain in the corrupt packet for processing. If not, go to step 38, otherwise go back to step 28.
Step 38: Pass the packet to higher levels for display. Go back to step 21.

Each received packet is processed according to the above steps for error detection and recovery.

Figure 5:
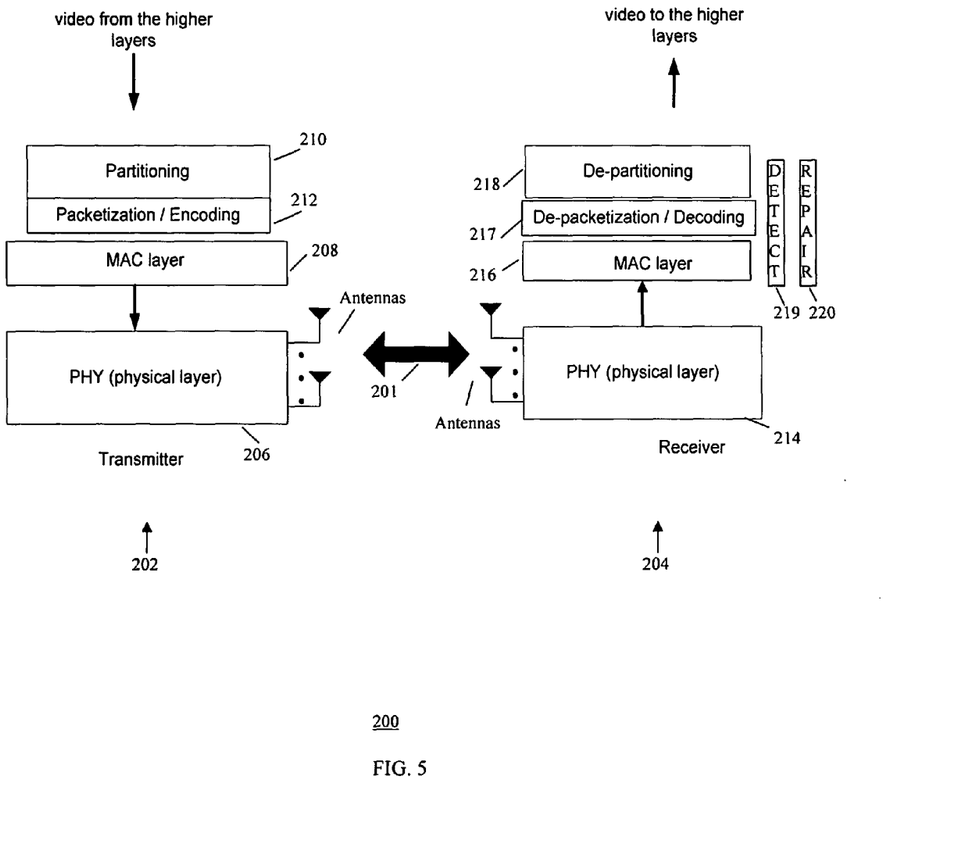
FIG. 5 shows a functional block diagram of an example communication system implementing spatial pixel partitioning and encoding mechanisms for transmission of uncompressed HD video over a wireless channel, according to an embodiment of the present invention.

FIG. 5 shows a functional block diagram of an example wireless communication system 200, according to an embodiment of the present invention. The system 200 includes a WiHD transmitter 202 and a WiHD receiver 204. The transmitter 202 includes a physical (PHY) layer 206 and a MAC layer 208. Similarly, the receiver 204 includes a PHY layer 214 and a MAC layer 216. The PHY and MAC layers enable wireless communication between the WiHD transmitter 202 and the WiHD receiver 204 via transmit antennas 203 and receiver antennas 205, respectively, over a wireless channel 201.

The transmitter 202 further includes a partitioning module 210 that receives video frames and implements the above partitioning steps on uncompressed video from higher layers, and a packetization and encoding module 212 that generates packets of data. The MAC layer 208 converts each data packet into a MAC packet by adding a MAC header to each data packet, and further calculates and adds CRC information to the data packet. The MAC packets are then provided to the PHY layer 206. The PHY layer 206 adds a PHY header to each MAC packet for transmission to the WiHD receiver 204 via transmit antennas 203.

In the receiver 204, the PHY layer 214 receives transmitted packets. The MAC layer 216 processes each received packet and performs error detection and error recovery according to the steps in the flowchart of FIG. 6. The WiHD receiver 204 further includes a de-packetization and decoding module 217 and a de-partitioning module 218. The de-packetization and decoding module 217 receives the processed packets from the MAC layer 216 and provides the bits in the packets to the de-partitioning module 218. The de-partitioning module 218 performs an inverse partitioning method of the partitioning module 210 to regenerate a video frame from the partitioned pixels in the packets.

The receiver 204 further includes an error detection module 219 and a repair module 220. The error detection module 219 detects lost or damaged pixels in packets (e.g., using CRC information). The repair module 220 utilizes information from neighboring pixels, as described, to compensate for that lost or damaged pixel when the de-partitioning module 218 performs said inverse partitioning steps. In one example, the detection module 219 and a repair module 220 performs the process steps in the flowchart of FIG. 4. In one example implementation, the detection module 219 and the repair module 220 can be logical components of the MAC layer 216 in the receiver 204.

In another example implementation, the MAC layer 208, the partitioning module 210, and the packetization and encoding 212 in the WiHD transmitter 202 are logical modules. As such, though in the example of FIG. 5 the partitioning module 210 and the packetization and encoding module 212 are shown as separate from the MAC layer 208, in another example, one or both of the logical modules 210 and 212 can be a component of the MAC layer 208. Similarly, in the WiHD receiver 204, one or both of the de-partitioning modules 218 and the de-packetization and decoding module 217 can be components of the MAC layer 216.

In accordance with further features of the present invention, an encoding method is provided for conserving transmission bandwidth. A typical HD video frame has M rows and N lines (columns), and a total of M*N pixels (* means multiplication). Each pixel has D bits, wherein at a frame updating frequency of f frames per second (frames/sec), the data rate required for transmission of an HD video frame is M*N*D*f bits per second. For example, in the 1080 p video format, each frame has 1920 rows and 1080 lines, and each pixel has 24 bits, such that if the frame updating frequency is 60 frame/sec, then the transmission data rate is 1920*1080*24*60=2,985,984,000 bps. In some cases, it may be difficult for wireless hardware and PHY layer to meet the bandwidth requirements of uncompressed HD video transmission.

To solve this problem, according to another aspect of the present invention, first a pixel partitioning process as described above is applied to partition the neighboring video pixels into K partitions wherein every K pixels form a block. Then, instead of placing all original video pixel information into packets, the value of the $n^{th}$ fixed position pixel is selected at every K pixel block as base information (n<K), and information of other pixels in the block is encoded within the same block (e.g., by using differential pulse code modulation (DPCM) or binary XOR (bXOR) encoding). The encoded pixels are termed DIFF pixels and transmitted in DIFF packets, and the pixels carrying the original video data are termed BASE pixels and transmitted in BASE packets.

Because spatially correlated pixels usually have very similar or even the same values, after DPCM or bXOR encoding, the Most Significant Bits (MSBs) of the DIFF pixels are mostly zero. In order to conserve transmission bandwidth, the zero bits need not be transmitted. Two example implementations of such an approach are hard truncation and Run Length Coding (RLC) as described below.

An example of hard truncation involves truncating the high order zero bits of encoded DIFF pixels, such that less number of bits is needed for transmission. Assuming one pixel has D bits, for a BASE pixel all of the D bits are used to carry the original data information. However, for a DIFF pixel, D1 bits (D1<D) are used for DPCM or bXOR encoding. Preferably, the exact value of D1 is selected in advance, according to video content types. If D1 is selected to be less than the bits required to carry encoded information for a DIFF pixel, then the D1 bits are set to the value closest to the real encoded value.

Figure 6:
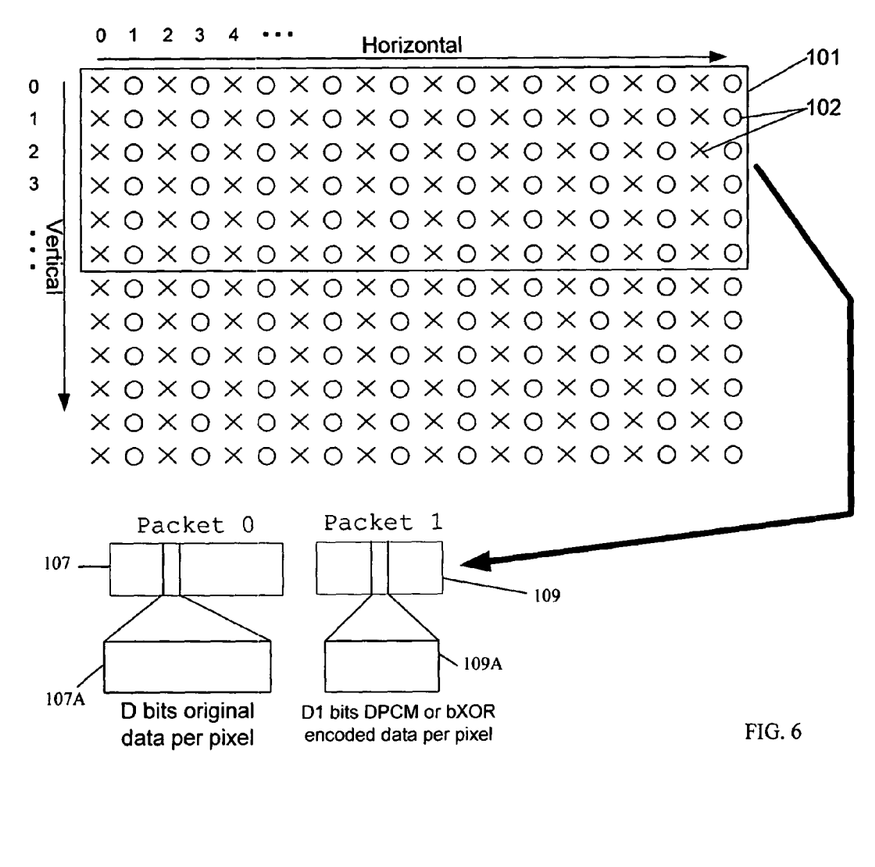
FIG. 6 shows an example of differential pulse code modulation (DPCM) or binary XOR (bXOR) encoding for DIFF pixels, according to an embodiment of the present invention.

FIG. 6 shows an example encoding scheme based on DPCM or bXOR encoding, wherein K=2 partitions. Similar to FIG. 1, in FIG. 6 the pixels are split horizontally into two groups: (1) the first group of pixels have indices i=0, 2, 4, . . . , etc., and indices j=0, 1, 2, . . . , etc.; and (2) the second group of pixels have indices i=1, 3, 5, etc., and indices j=0, 1, 2, . . . , etc.

A first packet 107 (i.e., Packet 0) is constructed which includes D bits 107A of the original data per pixel for said first group of pixels (BASE pixels). The first packet 107 is an example of a BASE packet. A second packet 109 (i.e., Packet 1) is constructed which includes D1 bits 109A for said second group of pixels that are DPCM or bXOR encoded per pixel (DIFF pixels). The second packet 109 is an example of a DIFF packet. In this example where K=2, then D=24 and D1=12, wherein for each DIFF pixel, 12 bits are used for transmission after DPCM or bXOR encoding.

The above hard truncation example is a simple solution to reduce the transmission bandwidth requirement. To avoid introduction of error for DIFF pixels, if D1 bits are insufficient for all of the bits of the DPCM or bXOR encoded value, then RLC is used for the DIFF pixels and the bit order is re-organized in each DIFF packet to carry DIFF pixels.

Figure 7:
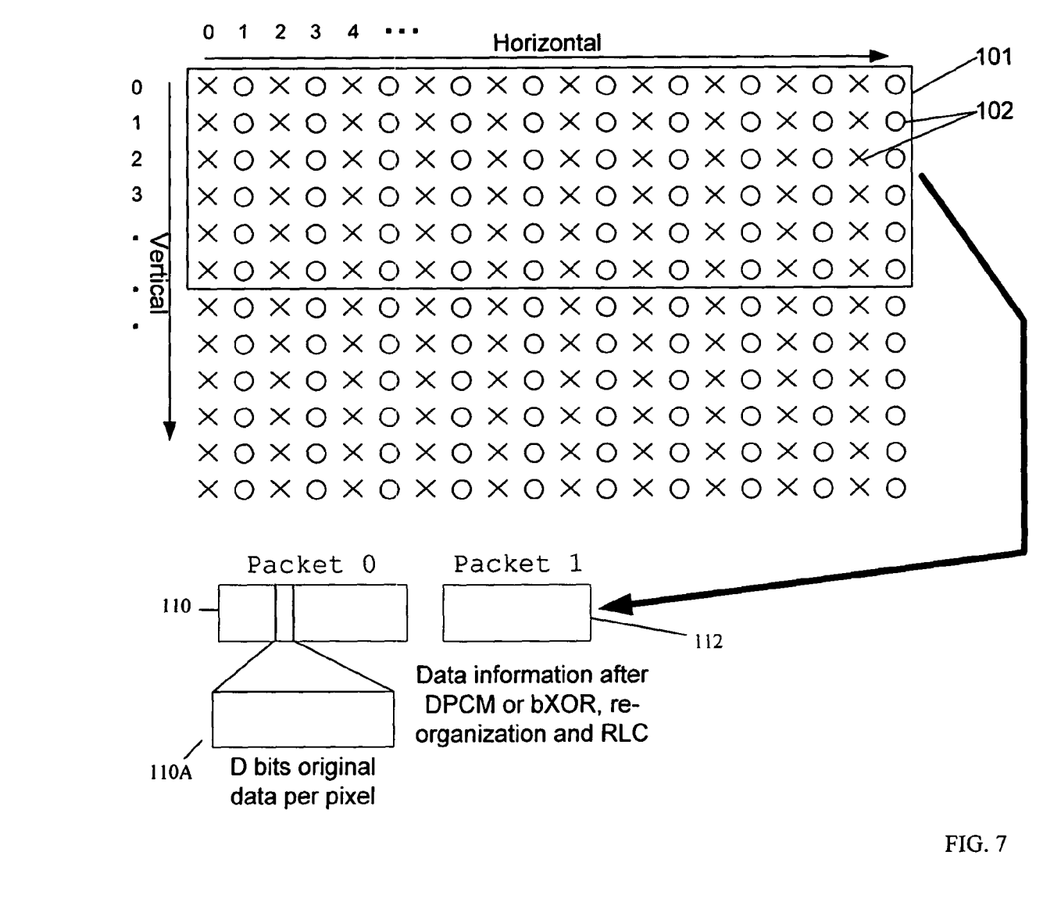
FIG. 7 shows an example of DPCM (or bXOR) and run-length coding (RLC) coding for DIFF pixels, according to an embodiment of the present invention.

FIG. 7 shows an example encoding scheme based on DPCM (or bXOR) and RLC for DIFF pixels to protect BASE pixels wherein K=2 partitions. Similar to FIG. 6, in FIG. 7 the pixels are split horizontally into two groups: (1) the first group of pixels have the indices i=0, 2, 4, etc., and j=0, 1, 2, . . . , etc.; and (2) the second group of pixels have indices i=1, 3, 5, . . . , etc., and j=0, 1, 2, etc.

A first packet 110 (i.e., Packet 0) is constructed which includes D bits 110A of the original data per pixel from said first group of pixels (BASE pixels). The first packet 110 is another example of a BASE packet. A second packet 112 (i.e., Packet 1) is constructed which includes data information after DPCM or bXOR encoding, re-organization and RLC, per pixel from said second group of pixels. The second packet 112 is another example of a DIFF packet.

The bits of the DIFF pixels in a DIFF packet 112 are grouped and re-ordered according to their information significance in the pixel. For example, the first MSBs of all pixels are grouped together, which are followed by the second MSBs of all pixels, and so on, up to the LSBs (Least Significant Bits) of all pixels. Then, RLC is applied either to the reorganized DIFF bits stream or to just the MSBs part of the reorganized bit stream. Since after DPCM or bXOR encoding most MSBs are zero, RLC can achieve high compression ratio without loss of any information. Note that it is also possible to aggregate multiple DIFF packets together to reduce various MAC layer overhead in wireless transmission.

The above encoding methods can be implemented in the transmitter 202 of system 200 in FIG. 5, as a logical component of the packetization module 212. The de-packetization module 217 in the receiver 204 then performs decoding steps which are inverse of the encoding steps in the transmitter 202.

As is known to those skilled in the art, the aforementioned example architectures described above, according to the present invention, can be implemented in many ways, such as program instructions for execution by a processor, as logic circuits, as an ASIC, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of transmitting uncompressed video over a wireless channel, comprising:
   inputting a frame of uncompressed video pixel information;
   partitioning the frame into a plurality of pixel sets;
   partitioning neighboring spatially correlated pixels of each pixel set into different partitions based on pixel indexes, wherein the neighboring spatially correlated pixels are positioned directly next to one another;
   placing pixels from each partition of the different partitions into different packets, wherein the neighboring spatially correlated pixels of each pixel set are partitioned from one another and placed into the different packets such that each different packet comprises non-neighboring adjacent pixels; and
   transmitting each packet separately over the wireless channel,
   wherein partitioning neighboring spatially correlated pixels of each pixel set into different partitions based on pixel indexes comprises partitioning based on multiple pixel index types comprising combinations of even and odd pixel indexes.

2. The method of claim 1 further comprising:
   receiving a transmitted packet;
   checking if a received packet is corrupt;
   recovering corrupt pixels using pixel information in other received packets containing neighboring spatially correlated pixels; and
   reconstructing the video frame from the neighboring spatially correlated pixels in the packets.

3. The method of claim 1 wherein recovering the corrupt pixels further includes:
   determining a difference between each pixel in the corrupt packet with a corresponding pixel of an adjacent non-corrupt packet; and
   if the difference is greater than a threshold, then recovering each corrupt pixel using corresponding pixel information in the adjacent non-corrupt packet.

4. The method of claim 3 wherein recovering each corrupt pixel using pixel information in the adjacent non-corrupt packet further includes replacing each corrupt pixel with a corresponding pixel from the adjacent non-corrupt packet.

5. The method of claim 4 wherein partitioning further includes partitioning the pixels, such that neighboring pixels with minimal spatial distance are placed into different packets for transmission over the wireless channel.

6. The method of claim 4 wherein partitioning further includes portioning the pixels into 2×2 blocks, and placing each pixel in a block in a different packet such that the pixels in a 2×2 block are individually separated into different packets.

7. The method of claim 4 wherein partitioning further includes portioning the pixels into 1×4 blocks, and placing each pixel in a block in a different packet.

8. The method of claim 1 wherein partitioning the pixels into different packets further includes:
   partitioning spatially correlated neighboring pixels into K different partitions, wherein K is a positive integer;
   selecting a value of the $n^{th}$ pixel at every K pixel block as base information, wherein n is a positive integer, and wherein n<K;
   for each block:
      placing the base information in a packet as BASE pixels; and
      encoding information of other pixels in the block as DIFF pixels, and placing the DIFF pixels in another packet.

9. The method of claim 8 further comprising, after encoding, truncating MSBs with zero values before transmission of a packet.

10. The method of claim 9 further comprising truncating high order zero bits of encoded DIFF pixels.

11. The method of claim 9 further comprising performing RLC for the DIFF pixels and re-ordering a bit order in each packet to carry DIFF pixels.

12. The method of claim 8 further comprising:
   receiving a transmitted packet;
   decoding the encoded pixels per packet; and
   reconstructing the video frame from the spatially correlated neighboring pixels in the packets.

13. The method of claim 1 further comprising generating error detection data for each packet, and appending the error detection data to each packet before transmission.

14. The method of claim 13 further comprising:
   receiving a transmitted packet;
   based on the appended error detection data, checking if a received packet is corrupt;
   recovering corrupt pixels using pixel information in other received packets containing neighboring spatially correlated pixels; and
   reconstructing the video frame from the neighboring spatially correlated pixels in the packets.

15. The method of claim 1, further comprising:
   receiving the packets; and
   if pixel information in a received packet is corrupt, then using pixel information in other received packets containing neighboring pixels to recover a pixel in the corrupt packet, whereby retransmission of lost information is not required.

16. The method of claim 15, wherein recovering the lost pixel comprises copying a pixel from a neighboring packet as the lost pixel information.

17. The method of claim 15, wherein recovering the lost pixel comprises using an average value of pixels in other neighboring packets as the lost pixel information.

18. The method of claim 1, wherein the partitioning comprises combinations of vertical and horizontal partitioning of the spatially correlated pixels.

19. The method of claim 18, wherein the multiple pixel index types comprise even and odd pixel index combinations.

20. The method of claim 1, wherein vertical and horizontal adjacent pixels are partitioned into different packets.

21. A wireless communication system comprising:
   a wireless transmitter including:
   a partitioning module inputs uncompressed video pixels from a video frame, partitions the video frame into a plurality of pixel sets, and partitions neighboring pixels of each pixel set into different partitions based on pixel indexes, wherein the neighboring pixels are positioned directly next to one another;
   a packetization module places the pixels from different partitions into different packets for transmission separately over a wireless channel, wherein the neighboring pixels of each pixel set are partitioned from one another and placed into the different packets such that each different packet comprises non-neighboring adjacent pixels;
   an error detection information generator calculates error detection data for each packet and appends the error detection data to the packet before transmission; and
   a wireless receiver including:
   an error recovery module receives packets and checks for corrupt packets, and recovers a corrupt pixel in a corrupt packet using pixel information in other received packets that contain neighboring pixels,
   wherein partitions neighboring pixels of each pixel set into different partitions based on pixel indexes comprises partitioning based on multiple pixel index types comprising combinations of even and odd pixel indexes.

22. The system of claim 21 wherein the error recovery module determines a difference between each pixel in a corrupt packet and a corresponding pixel in an adjacent non-corrupt packet, such that if the difference is greater than a threshold, the error recovery module corrects a corrupt pixel using pixel information in the adjacent non-corrupt packet.

23. The system of claim 22 wherein the error recovery module corrects each corrupt pixel based on an average value of neighboring pixels in the adjacent non-corrupt packet.

24. The system of claim 22 wherein the error recovery module corrects each corrupt pixel by replacing the corrupt pixel with a corresponding pixel in the adjacent non-corrupt packet.

25. The system of claim 24 wherein the partitioning module partitions the pixels such that pixels with minimal spatial distance are placed into different packets for separate transmission over the wireless channel.

26. The system of claim 21 wherein:
   the partitioning module partitions the pixels into K different partitions, wherein K is a positive integer;
   the packetization module selects the value of an $n^{th}$ pixel at every K pixel block as base information, and for each block, place the base information in a packet as BASE pixels, wherein n is a positive integer; and the transmitter further includes an encoder that encodes information of other pixels in the block as DIFF pixels, and places the DIFF pixels in another packet.

27. The system of claim 26 wherein the encoder performs encoding using DPCM encoding.

28. The system of claim 26 wherein the encoder performs encoding by bXOR encoding.

29. The system of claim 26 wherein the encoder eliminates MSBs with zero values before transmission.

30. The system of claim 29 wherein the encoder truncates high order zero bits of encoded DIFF pixels.

31. The system of claim 29 wherein the encoder performs RLC for the DIFF pixels and re-orders the bit order in each packet to carry DIFF pixels.

32. The system of claim 21 wherein the receiver further includes a de-partitioning module that reconstructs the video frame from the partitioned pixels in each received packet.

33. The system of claim 26 wherein the receiver further includes a decoder that decodes the encoded pixels in received packets.

34. A wireless transmitter comprising:
a partitioning module inputs uncompressed video pixels from a video frame, partitions the video frame into a plurality of pixel sets, and partitions geographically neighboring pixels of each pixel set into different partitions based on pixel indexes, wherein the geographically neighboring pixels are each positioned directly next to one another;
an error detection information generator calculates error detection data for each packet and appends the error detection data to the packet before transmission; and
a packetization module places the pixels from different partitions into different packets for separate transmission over a wireless channel, wherein the geographically neighboring pixels of each pixel set are partitioned from one another and placed into the different packets such that each different packet comprises non-neighboring adjacent pixels,
wherein partitions geographically neighboring pixels of each pixel set into different partitions based on pixel indexes comprises partitioning based on multiple pixel index types comprising combinations of even and odd pixel indexes.

35. The transmitter of claim 34 wherein the partitioning module partitions the pixels such that pixels with minimal spatial distance are placed into different packets for separate transmission over the wireless channel.

36. The transmitter of claim 35 wherein:
the partitioning module partitions the pixels into K different partitions, wherein K is a positive integer;
the packetization module selects the value of an $n^{th}$ pixel at every K pixel block as base information, and for each block, places the base information in a packet as BASE pixels, wherein n is a positive integer; and
the transmitter further includes an encoder that encodes information of other pixels in the block as DIFF pixels, and places the DIFF pixels in another packet.

37. The transmitter of claim 35 wherein the encoder performs encoding using DPCM encoding.

38. The transmitter of claim 35 wherein the encoder performs encoding by bXOR encoding.

39. The transmitter of claim 35 wherein the encoder eliminates MSBs with zero values before transmission.

40. The transmitter of claim 35 wherein the encoder truncates high order zero bits of encoded DIFF pixels.

41. The transmitter of claim 35 wherein the encoder performs RLC for the DIFF pixels and re-orders the bit order in each packet to carry DIFF pixels.

42. A wireless receiver comprising:
an error detection module receives packets of video pixel information and checks for corrupt packets; and
an error recovery module recovers a corrupt pixel in a corrupt packet using corresponding pixel information in other received packets that contain geographically neighboring spatially correlated pixels, wherein the geographically neighboring spatially correlated pixels are each positioned directly next to one another in a partitioned pixel set prior to being placed into the packets of video pixel information,
wherein different packets include different adjacent spatially correlated pixels of a partitioned pixel set of an uncompressed video frame,
wherein the geographically neighboring spatially correlated pixels of each partitioned pixel set are partitioned from one another based on pixel indexes and are placed into different packets such that each different packet comprises non-neighboring adjacent pixels,
wherein the partitioning the geographically neighboring spatially correlated pixels of each partitioned pixel set based on pixel indexes comprises partitioning based on multiple pixel index types comprising combinations of even and odd pixel indexes.

43. The receiver of claim 42 wherein the packets include video pixels that form partitions of neighboring spatially correlated pixels in the video frame.

44. The receiver of claim 43 further comprising a de-partitioning module that reconstructs the video frame partitions from the partitioned pixels in a plurality of received packets.

45. The receiver of claim 42 wherein the receiver further includes a decoder that decodes encoded pixels in the received packets.

46. The receiver of claim 42 wherein the error recovery module: determines a difference between each pixel in a corrupt packet and a corresponding neighboring pixel in an adjacent non-corrupt packet, such that if the difference is greater than a threshold, the error recovery module corrects a corrupt pixel using pixel information in the adjacent non-corrupt packet.

47. The receiver of claim 46 wherein the error recovery module corrects each corrupt pixel by replacing the corrupt pixel with a corresponding neighboring pixel in the adjacent non-corrupt packet.

48. A method of receiving uncompressed video over a wireless channel, comprising:
receiving packets of video pixel information, wherein different packets include different adjacent neighboring spatially correlated pixels of a partitioned pixel set of an uncompressed video frame, wherein the adjacent neighboring spatially correlated pixels are each positioned directly next to one another in the partitioned pixel set, wherein the neighboring spatially correlated pixels of each partitioned pixel set are partitioned from one another based on pixel indexes and placed into the different packets such that each different packet comprises non-neighboring adjacent pixels;
decoding encoded pixels in the received packets;
checking for corrupt packets; and
recovering a corrupt pixel in a corrupt packet using corresponding pixel information in other received packets that contain neighboring spatially correlated pixels, wherein the partitioning the neighboring spatially correlated pixels of each partitioned pixel set based on pixel indexes comprises partitioning based on multiple pixel index types comprising combinations of even and odd pixel indexes.

49. The method of claim 48, wherein the packets include video pixels that form partitions of adjacent neighboring spatially correlated pixels in the video frame, and further comprising reconstructing the video frame partitions from the partitioned pixels in a plurality of received packets.

50. The method of claim 49 wherein recovering a corrupt pixel further comprises:
determining a difference between each pixel in a corrupt packet and a corresponding neighboring pixel in an adjacent non-corrupt packet; and
if the difference is greater than a threshold value, then correcting a corrupt pixel using pixel information in the adjacent non-corrupt packet.

51. The method of claim 50 wherein correcting a corrupt pixel further comprises correcting each corrupt pixel by replacing the corrupt pixel with a corresponding original neighboring pixel in the adjacent non-corrupt packet.

52. The method of claim 1, wherein the neighboring spatially correlated pixels comprise adjacent geographically neighboring pixels that are each positioned directly next to one another either horizontally or vertically.

53. The method of claim 52,
wherein partitioning spatially correlated neighboring pixels into different partitions comprises horizontal partitioning adjacent spatially correlated neighboring pixels into one or more different partitions, wherein each of the spatially correlated neighboring pixels that are positioned directly next to one another are separated into the different packets.

54. The method of claim 52, wherein partitioning spatially correlated neighboring pixels into different partitions comprises vertical partitioning adjacent spatially correlated neighboring pixels into one or more different partitions, wherein each of the spatially correlated neighboring pixels that are positioned directly next to one another are separated into the different packets.

55. The method of claim 52, wherein partitioning spatially correlated neighboring pixels into different partitions comprises a combination of horizontal and vertical partitioning adjacent spatially correlated neighboring pixels into one or more different partitions, wherein each of the spatially correlated neighboring pixels that are positioned directly next to one another are separated from one another and partitioned into the different packets.

56. The method of claim 1, wherein neighboring spatially correlated pixels comprise directly adjacent pixels that are each individually positioned directly next to one another.

57. The method of claim 1, wherein placing pixels from the different partitions into different packets comprises distributing y number of spatially correlated pixels into z number of different packets where y≠z.

58. The method of claim 1, wherein the neighboring spatially correlated pixels of each pixel set are partitioned from one another and placed into the different packets such that each different packet comprises pixels from each pixel set that are non-neighboring adjacent pixels.

59. The method of claim 1, wherein the neighboring spatially correlated pixels of each pixel set are partitioned from one another and placed into the different packets such that each different packet comprises alternating pixels from each pixel set that were originally neighboring adjacent pixels.

60. The method of claim 4, wherein partitioning further includes portioning the pixels into 2×2 blocks, and placing each pixel in each block in a different packet such that each of the pixels in a 2×2 block are individually separated from one another and placed into different packets, wherein each packet comprises non-neighboring pixels from each original block.

* * * * *